(12) United States Patent
Mizushima et al.

(10) Patent No.: US 10,731,007 B2
(45) Date of Patent: Aug. 4, 2020

(54) ADDITION-CURABLE SILICONE RUBBER COMPOSITION AND CURED PRODUCT

(71) Applicant: SHIN-ETSU CHEMICAL CO., LTD., Tokyo (JP)

(72) Inventors: Hidenori Mizushima, Annaka (JP); Shigeru Ubukata, Annaka (JP); Shigeki Shudo, Annaka (JP); Nobu Kato, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 15 days.

(21) Appl. No.: 16/085,892

(22) PCT Filed: Jan. 24, 2017

(86) PCT No.: PCT/JP2017/002288
§ 371 (c)(1),
(2) Date: Sep. 17, 2018

(87) PCT Pub. No.: WO2017/159047
PCT Pub. Date: Sep. 21, 2017

(65) Prior Publication Data
US 2019/0092944 A1 Mar. 28, 2019

(30) Foreign Application Priority Data
Mar. 18, 2016 (JP) ................. 2016-055350

(51) Int. Cl.
| | |
|---|---|
| *C08L 83/04* | (2006.01) |
| *C08K 9/06* | (2006.01) |
| *C08G 77/12* | (2006.01) |
| *C08K 5/3475* | (2006.01) |
| *C08G 77/20* | (2006.01) |
| *C08K 5/5419* | (2006.01) |
| *C08K 5/544* | (2006.01) |
| *C08K 3/36* | (2006.01) |
| *C08K 3/013* | (2018.01) |

(52) U.S. Cl.
CPC ............ *C08G 77/12* (2013.01); *C08G 77/20* (2013.01); *C08K 3/36* (2013.01); *C08K 5/3475* (2013.01); *C08K 5/5419* (2013.01); *C08K 5/5442* (2013.01); *C08K 9/06* (2013.01); *C08L 83/04* (2013.01); *C08K 3/013* (2018.01)

(58) Field of Classification Search
CPC ........................... C09C 1/3063; C09C 1/3081
See application file for complete search history.

(56) References Cited

U.S. PATENT DOCUMENTS

| | | | | |
|---|---|---|---|---|
| 4,373,060 A | * | 2/1983 | Ching | ............... C08G 77/26 106/287.12 |
| 5,104,919 A | * | 4/1992 | Okami | ............. C08K 5/3472 524/100 |
| 5,936,054 A | * | 8/1999 | Achenbach | ......... C08K 5/3475 524/715 |
| 2003/0232202 A1 | | 12/2003 | Yaginuma et al. | |
| 2004/0157064 A1 | | 8/2004 | Aoki | |
| 2018/0134871 A1 | | 5/2018 | Kato et al. | |

FOREIGN PATENT DOCUMENTS

| | | |
|---|---|---|
| JP | 2-242854 A | 9/1990 |
| JP | 2004-18701 A | 1/2004 |
| JP | 2004-190013 A | 7/2004 |
| JP | 2006-225420 A | 8/2006 |
| WO | WO 2016/199742 A1 | 12/2016 |

OTHER PUBLICATIONS

"Functionalization of Silica Surface with UV-active Molecules by Multivalent Organosilicon Spacer" authored by Iliashevsky and published in the Open Journal of Inorganic Chemistry (2016) 6, 163-174.*

International Search Report for PCT/JP2017/002288 dated Apr. 25, 2017.

Written Opinion of the International Searching Authority for PCT/JP2017/002288 (PCT/ISA/237) dated Apr. 25, 2017.

* cited by examiner

*Primary Examiner* — Marc S Zimmer
(74) *Attorney, Agent, or Firm* — Birch, Stewart, Kolasch & Birch, LLP

(57) ABSTRACT

Provided is an addition-curable silicone rubber composition that contains (A) an alkenyl group-containing organopolysiloxane, (B) an organohydrogenpolysiloxane, (C) a platinum catalyst and (D) a reinforcement filler material surface treated with a benzotriazole derivative represented by formula (I)

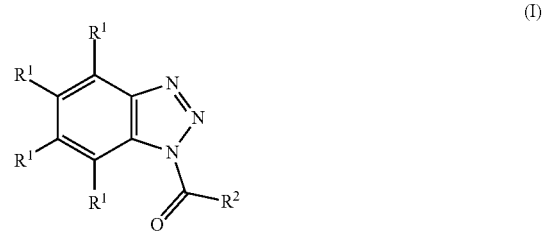

(in the formula, $R^1$ is a hydrogen atom or a monovalent hydrocarbon group and $R^2$ is a monovalent organic group) and that is capable of lowering the compression set of a cured article and suppressing changes in hardness after heat degradation characteristic testing while suppressing reduced curability. Also provided are a cured article thereof and a manufacturing method for the addition-curable silicone rubber composition.

9 Claims, No Drawings

ADDITION-CURABLE SILICONE RUBBER COMPOSITION AND CURED PRODUCT

TECHNICAL FIELD

This invention relates to an addition-curable silicone rubber composition which is cured into a cured silicone rubber having a low compression set and heat resistance without compromising mechanical properties (rubber properties) of silicone rubber and cure speed, a cured product thereof, and a method for preparing the silicone rubber composition.

BACKGROUND ART

Silicone rubbers are used in a wide variety of fields, for example, health care materials such as bottle teats and food-safe goods, hoses and gasket materials for automobile use, building members, and fiber coating materials because of heat resistance, freeze resistance, safety, appearance (transparency), touch, and durability.

Silicone rubbers used as gaskets such as O-rings and packings are required to have a low compression set and high heat resistance for preventing seal leakage. Typical silicone rubbers, however, have a substantial compression set and suffer from the problems of a change in shape and a significant increase in hardness during long-term service in high-temperature applications. In order to reduce the compression set and to suppress the hardness increase, often the rubbers shaped by heat curing must be further subject to secondary vulcanization at high temperature for a long time.

To solve the problems, Patent Document 1: JP-A H02-242854 proposes to add a triazole compound to an addition-curable silicone rubber composition for reducing the compression set thereof without a need for secondary vulcanization. Patent Document 2: JP-A 2006-225420 and Patent Document 3: JP-A 2004-190013 describe to add metal oxides and hindered amine compounds for suppressing any hardness increase, respectively. However, some of the cured products obtained by these methods have such physical properties as a compression set in excess of 30% as measured by a compression set test according to JIS K 6262:2013 using a specimen with a diameter of 13±0.5 mm and a thickness of 6.3±0.3 mm under 25% compression at 200° C. for 24 hours, and a hardness change in excess of +5 as measured by a heat aging test according to JIS K 6257:2010 at 225° C. for 72 hours. When these cured products are used as gaskets like O-rings and packings, the problem of seal leakage will arise.

PRIOR ART DOCUMENTS

Patent Documents

Patent Document 1: JP-A H02-242854
Patent Document 2: JP-A 2006-225420
Patent Document 3: JP-A 2004-190013

SUMMARY OF INVENTION

Technical Problem

An object of the present invention, which has been made to ameliorate the above-mentioned circumstances, is to provide an addition-curable silicone rubber composition which is tailored by adding a filler that is surface treated with a benzotriazole derivative of specific structure, so as to reduce the compression set of its cured product or to suppress any hardness change after a heat aging test, without a substantial loss of cure behavior, a cured product thereof, and a method for preparing the silicone rubber composition.

Solution to Problem

Making extensive investigation to attain the above object, the inventors have found that when a specific amount of a filler which is surface treated with a benzotriazole derivative of specific structure having the general formula (I) shown below is added to an addition-curable silicone rubber composition comprising an organopolysiloxane containing silicon-bonded alkenyl groups, an organohydrogenpolysiloxane, and a platinum catalyst, there is obtained an addition-curable silicone rubber composition which is cured into a cured silicone rubber having a low compression set and experiencing a minimal hardness change after a heat aging test, without a substantial loss of cure behavior. The invention is predicated on this finding.

Accordingly, the invention provides an addition-curable silicone rubber composition and a cured product thereof, and a method for preparing the silicone rubber composition, as defined below.

[1] An addition-curable silicone rubber composition comprising:

(A) 100 parts by weight of an alkenyl-containing organopolysiloxane having at least two silicon-bonded alkenyl groups per molecule, (B) an organohydrogenpolysiloxane having at least two silicon-bonded hydrogen atoms per molecule, in an amount of 0.2 to 20 parts by weight per 100 parts by weight of component (A), (C) a catalytic amount of a platinum catalyst, and (D) a reinforcing filler which is surface treated with a benzotriazole derivative in an amount of 2 to 1,000 moles per mole of platinum atom in component (C), the benzotriazole derivative having the general formula (I):

[Chem. 1]

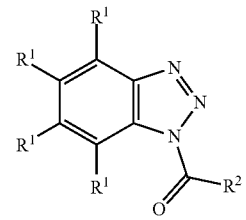

(I)

wherein $R^1$ is hydrogen or a $C_1$-$C_{10}$ monovalent hydrocarbon group and $R^2$ is a monovalent organic group, and a weight ratio of the benzotriazole derivative to the reinforcing filler ranging from 1:1 to 1:20.

[2] The addition-curable silicone rubber composition of [1] wherein in formula (I), $R^2$ is a $C_1$-$C_{10}$ monovalent hydrocarbon group or a group represented by the following formula:

[Chem. 2]

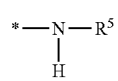

wherein $R^5$ is a $C_1$-$C_{15}$ monovalent hydrocarbon group or —$(CH_2)_p$—$Si(OR^6)_3$ wherein $R^6$ is a $C_1$-$C_4$ alkyl group or $SiR^7_3$ group (wherein $R^7$ is $C_1$-$C_4$ alkyl), p is an integer of 1 to 6, and * designates a bonding site.

[3] The addition-curable silicone rubber composition of [1] or [2], further comprising (E) 1 to 100 parts by weight per 100 parts by weight of component (A) of a reinforcing filler which is surface untreated and/or surface treated with an organosilicon compound other than the compound of formula (I).

[4] The addition-curable silicone rubber composition of [3] wherein component (E) is fumed silica having a specific surface area of at least 50 m²/g as measured by the BET method, the fumed silica being surface treated.

[5] The addition-curable silicone rubber composition of any one of [1] to [4], further comprising (F) 0.1 to 20 parts by weight per 100 parts by weight of component (A) of a non-functional silicone oil having a phenyl content of at least 10 mol % and a viscosity at 25° C. of 100 to 500 mPa·s as measured by a rotational viscometer according to JIS Z 8803:2011.

[6] A cured silicone rubber which is formed by curing the addition-curable silicone rubber composition of any one of [1] to [5] and has a compression set of up to 30% as measured by a compression set test according to JIS K 6262:2013 using a specimen with a diameter of 13±0.5 mm and a thickness of 6.3±0.3 mm under 25% compression at 200° C. for 24 hours.

[7] A cured silicone rubber which is formed by curing the silicone rubber composition of any one of [1] to [5] and experiences a hardness change of up to +5 as measured by a heat aging test according to JIS K 6257:2010 at 225° C. for 72 hours.

[8] A method for preparing an addition-curable silicone rubber composition, comprising the steps of:
surface treating a reinforcing filler with a benzotriazole derivative having the general formula (I):

[Chem. 3]

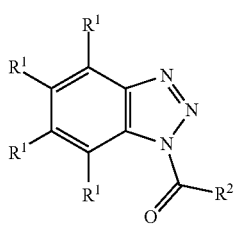

(I)

wherein $R^1$ is hydrogen or a $C_1$-$C_{10}$ monovalent hydrocarbon group and $R^2$ is a monovalent organic group, in such amounts that a weight ratio of the benzotriazole derivative to the reinforcing filler ranges from 1:1 to 1:20, to form a benzotriazole derivative-surface-treated reinforcing filler (D); and thereafter,
mixing the reinforcing filler (D) with (A) 100 parts by weight of an alkenyl-containing organopolysiloxane having at least two silicon-bonded alkenyl groups per molecule, (B) 0.2 to 20 parts by weight per 100 parts by weight of component (A) of an organohydrogenpolysiloxane having at least two silicon-bonded hydrogen atom per molecule, and (C) a catalytic amount of a platinum catalyst, such that 2 to 1,000 moles of the benzotriazole derivative with which the reinforcing filler is surface treated is available per mole of platinum atom in the platinum catalyst (C).

[9] The method for preparing an addition-curable silicone rubber composition of [8], further comprising the step of mixing the composition with (E) a reinforcing filler which is surface untreated and/or surface treated with an organosilicon compound other than the compound of formula (I), in an amount of 1 to 100 parts by weight per 100 parts by weight of component (A), and/or (F) a non-functional silicone oil having a phenyl content of at least 10 mol % and a viscosity at 25° C. of 100 to 500 mPa·s as measured by a rotational viscometer according to JIS Z 8803:2011, in an amount of 0.1 to 20 parts by weight per 100 parts by weight of component (A).

Advantageous Effects of Invention

The addition-curable silicone rubber composition of the invention comprising components (A) to (D) blended in specific amounts affords a silicone rubber having a low compression set without a substantial loss of cure behavior and without a need for long-term secondary vulcanization at high temperature. The resulting silicone rubber experiences a minimal hardness increase after a heat aging test.

DESCRIPTION OF EMBODIMENTS

Now the invention is described in detail.
[Component (A)]
Component (A), which is a main component (i.e., base polymer) of the composition, is an organopolysiloxane having at least two silicon-bonded alkenyl groups per molecule. Specifically, the organopolysiloxane has the average compositional formula (II).

$$R^3_a SiO_{(4-a)/2} \qquad (II)$$

Herein $R^3$ which may be the same or different is a substituted or unsubstituted monovalent hydrocarbon group of 1 to 12 carbon atoms, preferably 1 to 10 carbon atoms, and more preferably 1 to 8 carbon atoms, a is a positive number of 1.5 to 2.8, preferably 1.8 to 2.5, and more preferably 1.95 to 2.05.

Examples of the silicon-bonded substituted or unsubstituted monovalent hydrocarbon group of 1 to 12 carbon atoms, preferably 1 to 10 carbon atoms, and more preferably 1 to 8 carbon atoms, represented by $R^3$ include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl, and naphthyl; aralkyl groups such as benzyl, phenylethyl, and phenylpropyl; alkenyl groups such as vinyl, allyl, propenyl, isopropenyl, butenyl, hexenyl, cyclohexenyl, and octenyl; and substituted forms of the foregoing groups in which some or all hydrogen atoms are substituted by halogen atoms (e.g., fluorine, bromine and chlorine), cyano or the like, such as chloromethyl, chloropropyl, bromoethyl, trifluoropropyl, and cyanoethyl. It is preferred that at least 90 mol % of all $R^3$ groups be methyl.

Of $R^3$ groups, at least two groups must be alkenyl groups, preferably of 2 to 8 carbon atoms, more preferably of 2 to 6 carbon atoms, and most preferably vinyl.

In the organopolysiloxane, the content of alkenyl groups is preferably $1.0 \times 10^{-6}$ mol/g to $3.0 \times 10^{-3}$ mol/g, more preferably $1.0 \times 10^{-5}$ mol/g to $2.0 \times 10^{-3}$ mol/g. An organopolysiloxane containing less than $1.0 \times 10^{-6}$ mol/g of alkenyl may have too low a rubber hardness and become gel. An alkenyl content in excess of $3.0 \times 10^{-3}$ mol/g may give an extremely high crosslinking density, resulting in rubber having an extremely high hardness and devoid of elasticity. The alkenyl group may be bonded to the silicon atom at the end of the molecular chain and/or a silicon atom midway of the molecular chain (i.e., at a non-terminal position of the molecular chain).

The organopolysiloxane is preferably a linear diorganopolysiloxane capped at both ends of the molecular chain with a triorganosiloxy group ($R^3_3SiO_{1/2}$) and having a backbone composed of repeating diorganosiloxane units ($R^3_2SiO_{2/2}$). An organopolysiloxane partially containing a branched or cyclic structure having monoorganosilsesquioxane units ($R^3SiO_{3/2}$) is also acceptable. Herein $R^3$ is as defined above.

With respect to molecular weight or degree of polymerization, the organopolysiloxane typically has an average degree of polymerization (i.e., number average degree of polymerization, the same applies hereinafter) of 100 to 10,000, preferably 150 to 1,000. An organopolysiloxane having a degree of polymerization of less than 100 may fail to provide a cured product with adequate rubber texture whereas an organopolysiloxane having a degree of polymerization in excess of 10,000 may have too high a viscosity to mold. The molecular weight or degree of polymerization may be measured, for example, as number average molecular weight or number average degree of polymerization by gel permeation chromatography (GPC) versus polystyrene standards using toluene as developing solvent (the same applies hereinafter).

The organopolysiloxane preferably has a viscosity at 25° C. of 100 to 12,000,000 mPa·s, and more preferably 1,000 to 100,000 mPa·s, as measured by a rotational viscometer according to JIS Z 8803:2011.

Examples of the organopolysiloxane as component (A) include
molecular both end diorganoalkenylsiloxy-blocked diorganopolysiloxane,
molecular both end organodialkenylsiloxy-blocked diorganopolysiloxane,
molecular both end trialkenylsiloxy-blocked diorganopolysiloxane,
molecular both end triorganosiloxy-blocked diorganosiloxane/organoalkenylsiloxane copolymers,
molecular both end diorganoalkenylsiloxy-blocked diorganosiloxane/organoalkenylsiloxane copolymers, and
diorganosiloxane/organoalkenylsiloxane copolymers blocked at one end with a diorganoalkenylsiloxy group and at the other end with a triorganosiloxy group.
Inter alia, molecular both end diorganoalkenylsiloxy-blocked diorganopolysiloxane,
molecular both end triorganosiloxy-blocked diorganosiloxane/organoalkenylsiloxane copolymers, and
molecular both end diorganoalkenylsiloxy-blocked diorganosiloxane/organoalkenylsiloxane copolymers are preferred. The "organo" group in each siloxane means a substituted or unsubstituted monovalent hydrocarbon group (exclusive of aliphatic unsaturated groups such as alkenyl) as exemplified for $R^3$ in formula (II).

[Component (B)]

Component (B) is an organohydrogenpolysiloxane having at least 2, preferably at least 3 silicon-bonded hydrogen atoms (or SiH groups) in a molecule. Component (B) serves as a curing agent or crosslinker for curing the composition through the mechanism that hydrosilylation or addition reaction takes place between SiH groups in its molecule and silicon-bonded alkenyl groups in component (A) to form crosslinks.

Preferred as component (B) is an organohydrogenpolysiloxane having at least 2, preferably at least 3, more preferably 3 to 100, and most preferably 4 to 50 silicon-bonded hydrogen atoms (or SiH groups) in a molecule, represented by the average compositional formula (III).

$$R^4_bH_cSiO_{(4-b-c)/2} \quad (III)$$

Herein $R^4$ which may be the same or different is a substituted or unsubstituted monovalent hydrocarbon group of 1 to 12 carbon atoms, preferably 1 to 10 carbon atoms, and more preferably 1 to 8 carbon atoms, b is a positive number of 0.7 to 2.1, c is a positive number of 0.001 to 1.0, and b+c is 0.8 to 3.0.

Examples of the monovalent hydrocarbon group represented by $R^4$ are as exemplified above for $R^3$, with hydrocarbon groups free of aliphatic unsaturation being preferred.

The subscript b is a positive number of 0.7 to 2.1, preferably 0.8 to 2.0, c is a positive number of 0.001 to 1.0, preferably 0.01 to 1.0, and the sum of b+c is 0.8 to 3.0, preferably 1.0 to 2.5. The molecular structure of the organohydrogenpolysiloxane may be linear, cyclic, branched, or three-dimensional network.

In the organohydrogenpolysiloxane, the content of SiH groups is preferably 0.0005 mol/g to 0.020 mol/g, more preferably 0.001 mol/g to 0.017 mol/g. A SiH content of less than 0.0005 mol/g may lead to insufficient crosslinking whereas an organohydrogenpolysiloxane with a SiH content in excess of 0.020 mol/g may be unstable.

More preferred is an organohydrogenpolysiloxane in which the number of silicon atoms per molecule (i.e., degree of polymerization) is 2 to 300, even more preferably 3 to 150, most preferably 4 to 100 and which is liquid at room temperature (25° C.). The silicon-bonded hydrogen atom may be present at the end of the molecular chain and/or at a position midway of the molecular chain (i.e., at a non-terminal position).

Examples of the organohydrogenpolysiloxane as component (B) include 1,1,3,3-tetramethyldisiloxane, 1,3,5,7-tetramethylcyclotetrasiloxane, tris(hydrogendimethylsiloxy) methylsilane, tris(hydrogendimethylsiloxy)phenylsilane, methylhydrogencyclopolysiloxane, methylhydrogensiloxane/dimethylsiloxane cyclic copolymers,
molecular both end trimethylsiloxy-blocked methylhydrogenpolysiloxane,
molecular both end trimethylsiloxy-blocked dimethylsiloxane/methylhydrogensiloxane copolymers,
molecular both end dimethylhydrogensiloxy-blocked dimethylpolysiloxane,
molecular both end dimethylhydrogensiloxy-blocked dimethylsiloxane/methylhydrogensiloxane copolymers,
molecular both end trimethylsiloxy-blocked methylhydrogensiloxane/diphenylsiloxane copolymers,
molecular both end trimethylsiloxy-blocked methylhydrogensiloxane/diphenylsiloxane/dimethylsiloxane copolymers,
molecular both end trimethylsiloxy-blocked methylhydrogensiloxane/methylphenylsiloxane/dimethylsiloxane copolymers,
molecular both end dimethylhydrogensiloxy-blocked methylhydrogensiloxane/dimethylsiloxane/diphenylsiloxane copolymers,
molecular both end dimethylhydrogensiloxy-blocked methylhydrogensiloxane/dimethylsiloxane/methylphenylsiloxane copolymers,
copolymers consisting of $(CH_3)_2HSiO_{1/2}$ units, $(CH_3)_3SiO_{1/2}$ units, and $SiO_{4/2}$ units,
copolymers consisting of $(CH_3)_2HSiO_{1/2}$ units and $SiO_{4/2}$ units,
copolymers consisting of $(CH_3)_2HSiO_{1/2}$ units, $SiO_{4/2}$ units, and $(C_6H_5)SiO_{3/2}$ units, and other forms of the foregoing compounds in which some or all methyl groups are substituted by other alkyl groups or phenyl groups.

The organohydrogenpolysiloxane as component (B) may also be a polyvalent aromatic ring-containing organohydrogenpolysiloxane which corresponds to the above-exemplified compound or similar compound, but has a di- to tetravalent aromatic ring-containing hydrocarbon skeleton (e.g., phenylene skeleton, bisphenylene skeleton, bis(phenylene)ether skeleton, bis(phenylene)methane skeleton, 2,2-bis(phenylene)propane skeleton, and 2,2-bis(phenylene) hexafluoropropane skeleton) in some of siloxane skeletons (—Si—O—Si—) (typically, at some of the positions of oxygen atoms in siloxane bonds) to constitute its molecule.

The organohydrogenpolysiloxane as component (B) is added in an amount of 0.2 to 20 parts, preferably 0.3 to 10 parts by weight per 100 parts by weight of component (A). Component (B) is preferably added in such an amount that the molar ratio of silicon-bonded hydrogens (or SiH) in organohydrogenpolysiloxane as component (B) to total silicon-bonded alkenyl groups in components (A) and (B), especially component (A), referred to as "SiH/alkenyl ratio", may be from 0.8/1 to 10/1, more preferably 1.0/1 to 5/1. If the SiH/alkenyl ratio is less than 0.8, cure or crosslinking density may be insufficient, resulting in a sticky rubber. If the SiH/alkenyl ratio exceeds 10, a molded silicone rubber may contain bubbles or its mold release be difficult.

[Component (C)]

Component (C) is a platinum catalyst which is added to promote hydrosilylation reaction between the alkenyl-containing organopolysiloxane as component (A) and the organohydrogenpolysiloxane as component (B) for crosslinking. Examples of the platinum catalyst as component (C) include platinum group metal base catalysts such as platinum black, platinic chloride, chloroplatinic acid, the reaction product of chloroplatinic acid with monohydric alcohol, chloroplatinic acid-olefin complexes, and platinum bisacetoacetate.

The platinum catalyst may be used in a catalytic amount, which is typically about 0.5 to about 1,000 ppm, specifically about 1 to about 500 ppm by weight of platinum group metal based on the total weight of components (A) to (D), or components (A) to (E), components (A) to (D) and (F), or components (A) to (F) when components (E) and/or (F) to be described below are blended.

[Component (D)]

Component (D) is a reinforcing filler which is surface treated with a benzotriazole derivative. It is added to reinforce the rubber strength of a cured product of the addition-curable silicone rubber composition of the invention. The surface treatment of the reinforcing filler with a benzotriazole derivative is effective for reducing the compression set of the cured product and suppressing a hardness change after a heat aging test without a substantial loss of cure behavior. The surface treatment allows the benzotriazole derivative to react with silanol groups (SiOH groups) on the reinforcing filler surface to form covalent bonds, or intermolecular interaction such as intermolecular force to form van der Waals bonds.

In component (D), the benzotriazole derivative has the general formula (I):

[Chem. 4]

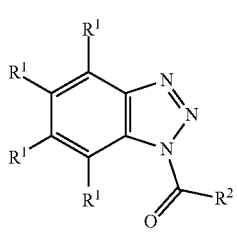

(I)

wherein $R^1$ is hydrogen or a $C_1$-$C_{10}$ monovalent hydrocarbon group and $R^2$ is a monovalent organic group.

Herein $R^1$ is hydrogen or a monovalent hydrocarbon group of 1 to 10 carbon atoms, preferably 1 to 6 carbon atoms. Examples of the $C_1$-$C_{10}$ monovalent hydrocarbon group include alkyl groups such as methyl, ethyl, propyl, isopropyl, butyl, isobutyl, tert-butyl, pentyl, neopentyl, hexyl, and cyclohexyl; and substituted forms of the foregoing groups in which some or all hydrogen atoms are substituted by halogen atoms (e.g., fluorine, bromine, and chlorine), cyano, or the like, such as chloromethyl, chloropropyl, bromoethyl, trifluoropropyl, and cyanoethyl. Of these, hydrogen and methyl are preferred in view of synthesis.

$R^2$ is a monovalent organic group, and examples include $C_1$-$C_{10}$ monovalent hydrocarbon groups, for example, alkyl groups such as methyl, ethyl, propyl, isopropyl, butyl, isobutyl, tert-butyl, pentyl, neopentyl, hexyl, and cyclohexyl; aryl groups such as phenyl, tolyl, xylyl, and naphthyl; aralkyl groups such as benzyl, phenylethyl, and phenylpropyl; and groups having the following formula.

[Chem. 5]

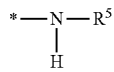

Herein $R^5$ is a monovalent hydrocarbon group, typically alkyl, of 1 to 15 carbon atoms, specifically 1 to 10 carbon atoms, or —$(CH_2)_p$—$Si(OR^6)_3$ wherein $R^6$ is an alkyl group of 1 to 4 carbon atoms, specifically 1 to 3 carbon atoms, or $SiR^7_3$ group wherein $R^7$ is an alkyl group of 1 to 4 carbon atoms, specifically 1 to 3 carbon atoms, p is an integer of 1 to 6, specifically 1 to 3, and * designates a bonding site.

$R^5$ is preferably —$(CH_2)_p$—$Si(OR^6)_3$ because the terminal hydrolyzable silyl group can react with the surface of a reinforcing filler to firmly bind the triazine skeleton to the filler surface.

Examples of the benzotriazole derivative are given below.

[Chem. 6]

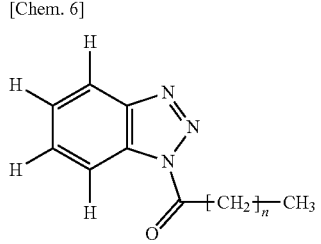

Herein n is an integer of 0 to 6.

[Chem. 7]

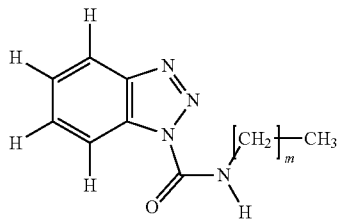

Herein m is an integer of 1 to 6.

[Chem. 8]

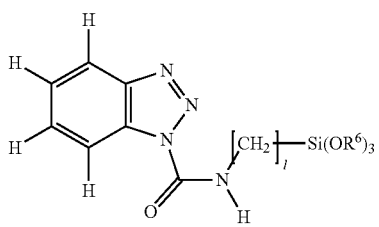

Herein l is an integer of 1 to 6 and $R^6$ is alkyl group or trialkylsilyl group.

Of these, most preferred groups are given by the following formulae.

[Chem. 9]

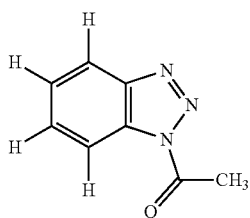

[Chem. 10]

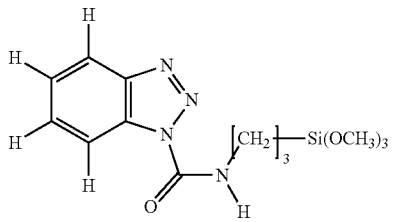

[Chem. 11]

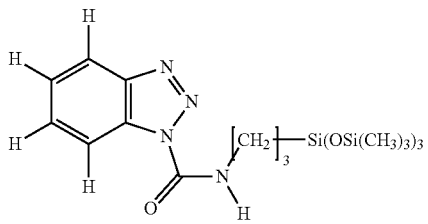

The amount of the benzotriazole derivative in component (D) blended is 2 to 1,000 moles, preferably 2 to 800 moles, more preferably 2 to 500 moles, and even more preferably 2 to 100 moles per mole of platinum atom in component (C). Less than 2 moles of the benzotriazole derivative is too small to achieve a sufficient reduction of compression set whereas more than 1,000 moles may interfere with cure.

A raw material for the benzotriazole derivative-surface-treated reinforcing filler as component (D) is preferably reinforcing silica fine powder. The reinforcing silica fine powder, which is not particularly limited in type, may be any type of silica commonly used as rubber reinforcement. Although any silica fine powder used in conventional silicone rubber compositions is useful, the reinforcing silica fine powder used should preferably have a specific surface area of at least 50 m²/g as measured by the BET method. It is advantageous to use precipitated silica (wet silica), fumed silica (dry silica) and fired silica having a BET specific surface area of 50 to 400 m²/g, specifically 100 to 350 m²/g.

For the surface treatment of the filler with the benzotriazole derivative, any well-known techniques may be used. For example, an untreated silica fine powder and a benzotriazole derivative are added into a mechanical kneading device closed under atmospheric pressure or a fluidized bed where they are mixed to effect surface treatment at room temperature (25° C.) or at an elevated temperature (of 25 to 150° C.) for 1 to 30 minutes, optionally in the presence of an inert gas. If desired, water and a catalyst (e.g., hydrolysis accelerant) may be used to promote the surface treatment. The kneading step is followed by drying, yielding a reinforcing filler surface treated with the benzotriazole derivative. The weight ratio of the benzotriazole derivative to the reinforcing filler blended may be from 1:1 to 1:20, and preferably from 1:2 to 1:15. Ratios outside the range may fail to reduce the compression set of a cured product or to suppress any hardness change after a heat aging test. Also component (D) is preferably blended in an amount of 0.1 to 10 parts by weight, and more preferably 0.5 to 5.0 parts by weight per 100 parts by weight of component (A).

The reinforcing filler which has been surface treated with the benzotriazole derivative functions, under interaction with the platinum catalyst as component (C), to reduce the compression set of cured silicone rubber and suppress a hardness increase after a heat aging test.

[Component (E)]

Further, a reinforcing filler is preferably added as component (E) to the silicone rubber composition. In this embodiment, the reinforcing filler is preferably reinforcing silica fine powder. The reinforcing silica powder as component (E), which is not particularly limited in type, may be any type of silica commonly used as rubber reinforcement. Although any silica fine powder used in conventional silicone rubber compositions is useful, the reinforcing silica fine powder should preferably have a specific surface area of at least 50 m²/g as measured by the BET method. It is advantageous to use precipitated silica (wet silica), fumed silica (dry silica) and fired silica having a BET specific surface area of 50 to 400 m²/g, specifically 100 to 350 m²/g, with the fumed silica being especially advantageous for improved rubber strength. The reinforcing silica fine powder used is preferably surface treated with a surface treating agent other than the compound of formula (I) in component (D), such as organosilicon compounds, typically hydrolyzable organosilicon compounds such as chlorosilanes, alkoxysilanes, and organosilazanes for rendering the surface hydrophobic. The silica fine powder may be directly surface treated (to be hydrophobic) in the powder state with a surface treating agent prior to use. Alternatively, the silica fine powder may be surface treated (to be hydrophobic) by adding a surface treating agent during the step of kneading the silica fine powder with silicone oil (e.g., alkenyl-containing organopolysiloxane as component (A)).

For the surface treatment of component (E), any well-known techniques may be used. For example, an untreated silica fine powder and a surface treating agent are added into a mechanical kneading device closed under atmospheric pressure or a fluidized bed where they are mixed to effect surface treatment at room temperature or elevated temperature, optionally in the presence of an inert gas. If desired, a catalyst (e.g., hydrolysis accelerant) is used to promote the surface treatment. The kneading step is followed by drying, yielding a treated silica fine powder. The amount of the surface treating agent used may be at least the theoretical amount calculated from the surface area of powder to be covered with the agent.

Suitable treating agents include silazanes such as hexamethyldisilazane; silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane, and chloropropyltrimethoxysilane; and organosilicon compounds such as polymethylsiloxane and organohydrogenpolysiloxane. After the surface treatment with such agents, the resulting silica fine particles are hydrophobic and ready for use. Of these treating agents, the silane coupling agents and silazanes are preferred.

The amount of component (E) blended is 1 to 100 parts, preferably 5 to 60 parts, and more preferably 10 to 60 parts by weight per 100 parts by weight of component (A). Less than 1 part by weight of component (E) may be insufficient for reinforcement whereas a silicone rubber composition with more than 100 parts by weight of component (E) may be too viscous to work or process. When component (E) is blended, the weight ratio of component (D) to component (E) is preferably from 1:5 to 1:150, and more preferably from 1:10 to 1:100. Ratios outside the range may fail to reduce the compression set of a cured product or to suppress any hardness change after a heat aging test.

[Component (F)]

Component (F) used in the invention is a non-functional silicone oil. It is an oil component to be bled from a rubber part to impart lubricity thereto. In a certain application, for example, a connecter for stacking molded resin parts, component (F) is necessary for reducing insertion forces or achieving a seal. The non-functional silicone oil is a silicone oil which is free of a reactive functional group (e.g., silicon-bonded alkenyl or silicon-bonded hydrogen (SiH group)) capable of crosslinking reaction with an organopolysiloxane component as component (A) constituting an addition-curable silicone rubber composition or other reactive functional groups in the molecule (typically, a linear diorganopolysiloxane having a backbone composed of repeating diorganosiloxane units and capped at either end of the molecular chain with a triorganosiloxy group). The silicone oil should have a phenyl content (i.e., mol % relative to total silicon-bonded monovalent organic groups (substituted or unsubstituted monovalent hydrocarbon groups) in the organopolysiloxane, the same applies hereinafter) of at least 10 mol % (typically, 10 to 85 mol %), preferably 15 to 80 mol %, and more preferably 20 to 70 mol %. This construction ensures adequate adhesion to resins, a sufficient amount of oil bled on the surface of molded rubber, and an adequate bleeding rate of oil.

The silicon-bonded monovalent organic groups (substituted or unsubstituted monovalent hydrocarbon groups) other than phenyl are preferably alkyl groups of about 1 to about 6 carbon atoms, especially methyl group.

The non-functional silicone oil preferably has a viscosity at 25° C. of from 100 mPa·s to 500 mPa·s, and more preferably from 150 mPa·s to 450 mPa·s, as measured by a rotational viscometer according to JIS Z 8803:2011. Examples of the phenyl group-containing silicone oil include dimethylsiloxane/diphenylsiloxane copolymers and dimethylsiloxane/methylphenylsiloxane copolymers. The phenyl group-containing silicone oil is preferably linear, and is preferably capped at both ends of the molecular chain with a triorganosiloxy group such as trimethylsiloxy, phenyldimethylsiloxy or diphenylmethylsiloxy.

The amount of non-functional silicone oil (F) blended is 0.1 to 20 parts by weight, preferably 1 to 15 parts by weight, and more preferably 2 to 10 parts by weight per 100 parts by weight of component (A). More than 20 parts by weight leads to a cost increase.

In combination with the phenyl-containing silicone oil, a non-functional silicone oil having a trifluoropropyl or perfluoroalkylether group, a silicone-modified perfluoroalkylether compound or the like may be used as long as the above-defined conditions are not compromised.

[Other Components]

Other components may be compounded in the addition-curable silicone rubber composition, if necessary. Included are non-reinforcing fillers such as quartz powder, diatomaceous earth, and calcium carbonate; conductive agents such as carbon black, conductive zinc oxide, and metal powder; hydrosilylation inhibitors such as nitrogen-containing compounds, acetylene compounds, phosphorus compounds, nitrile compounds, carboxylates, tin compounds, mercury compounds, and sulfur compounds; heat resistance improvers such as iron oxide and cerium oxide; internal mold release agents such as dimethylsilicone oil; adhesion promoters such as organosilicon compounds, typically alkoxysilanes, containing at least one functional group selected from alkenyl, epoxy, amino, (meth)acryloxy, and mercapto groups, but not SiH groups in the molecule; and thixotropic agents.

The invention also provides a method for preparing the addition-curable silicone rubber composition. Components (A) to (C), and optionally component (E) (a reinforcing filler and a surface treating agent when a surface untreated filler is used), component (F), and other components are mixed, then a benzotriazole derivative-surface-treated reinforcing filler (D) as prepared by the above method is added, and the contents are further mixed to produce a silicone rubber composition of the invention. The mixing step is preferably carried out at room temperature (25° C.) or at an elevated temperature of 25 to 150° C., if necessary, for 1 to 30 minutes. The manufacturing equipment is not particularly limited, and mixing devices such as Planetary Mixer and kneading devices such as kneader mixer and three roll mill may be used.

The addition-curable silicone rubber composition may be molded and cured in accordance with standard methods. An appropriate molding method may be selected from injection molding, transfer molding, cast molding, and compression molding depending on the intended application. The curing conditions used herein may be heat treatment (or primary vulcanization) conditions at 40 to 230° C. for about 3 seconds to about 160 minutes.

The cure speed of the addition-curable silicone rubber composition is defined by computing a value of T90-T10 using T10 (in sec) which is a 10% cure time (i.e., a time taken from the start of measurement until the torque value reaches 10% of the maximum torque value at 2 minutes from the start of measurement, at 130° C.) and T90 (in sec) which is a 90% cure time (i.e., a time taken from the start of measurement until the torque value reaches 90% of the maximum torque value at 2 minutes from the start of measurement, at 130° C.) as measured at 130° C. for 2 minutes by a cure tester (e.g., rotorless disc rheometer or moving die rheometer (MDR)). With a focus on molding efficiency, the value of T90-T10 is preferably up to 40 seconds, more preferably up to 30 seconds. A value of T90-T10 in excess of 40 seconds indicates a redundant molding cycle which may be uneconomical.

The addition-curable silicone rubber composition is cured into a cured product (silicone rubber) having a compression set of up to 30%, and specifically up to 25% as measured by a compression set test according to JIS K 6262:2013 using a specimen with a diameter of 13±0.5 mm and a thickness of 6.3±0.3 mm under 25% compression at 200° C. for 24 hours, and experiencing a hardness change of up to +5, and specifically up to +3 as measured by a heat aging test according to JIS K 6257:2011 at 225° C. for 72 hours. The cured product having a compression set of up to 30% and a hardness change of up to +5 in a heat aging test at 225° C. for 72 hours is effective for preventing seal leakage when used as gaskets such as O-rings and packings. The above compression set and heat aging properties are achievable by blending component (D) in the above-mentioned amount with a conventional addition-curable silicone rubber composition containing components (A) to (C) until uniform.

The addition-curable silicone rubber composition of the invention is useful in the application where a compression set as low as possible is required and the application where long-term heat resistance is required, especially as sealing materials such as O-rings and gaskets.

EXAMPLES

Examples and Comparative Examples of the invention are given below by way of illustration and not by way of limitation. All parts are by weight. The average degree of polymerization is a number average degree of polymerization as measured by gel permeation chromatography (GPC) versus polystyrene standards using toluene as developing solvent.

Example 1

A silicone rubber base 1 was obtained by using 70 parts of molecular both end dimethylvinylsiloxy-blocked dimethylpolysiloxane A (degree of polymerization of 620) having a viscosity at 25° C. of 20,000 mPa·s as component (A) and 40 parts of fumed silica having a specific surface area of 200 m²/g, adding 6 parts of hexamethyldisilazane thereto, placing them in a kneader mixer, mixing until uniform, and then heat mixing at 150° C. for a further 3 hours. The silicone rubber base 1, 116 parts, was combined with 1.50 parts of methylhydrogenpolysiloxane B blocked at molecular both ends with trimethylsiloxy group, having SiH groups on side chains (molecular both end trimethylsiloxy-blocked dimethylsiloxane/methylhydrogensiloxane copolymer having a degree of polymerization of 46 and a SiH content of 0.0050 mol/g) (SiH group/vinyl=2.0 mol/mol) as component (B) and 0.05 part of ethynylcyclohexanol as reaction inhibitor, which were agitated at room temperature for 15 minutes. Then, 0.10 part of a toluene solution of platinum-1,3-divinyl-1,1,3,3-tetramethyldisiloxane complex C having a Pt concentration of 1 wt % as component (C) and 5 parts of molecular both end trimethylsiloxy-blocked dimethylsiloxane/diphenylsiloxane copolymer F having a phenyl group content of 20 mol % and a viscosity at 25° C. of 200 mPa·s as component (F) were added to the mixture, which was stirred at room temperature for 15 minutes, yielding a silicone rubber blend A.

On a closed mechanical kneading device under atmospheric pressure, 10 parts of a benzotriazole derivative having the formula (1) below and 100 parts of fumed silica (trade name: AEROSIL 300, by Nippon Aerosol Co., Ltd.) having a specific surface area of 300 m²/g were mixed and treated at room temperature. At the end of mixing, the mixture was dried, obtaining a reinforcing filler D1 which had been surface treated with the benzotriazole derivative (a blending ratio of the benzotriazole derivative to the reinforcing filler being 1:10 on weight basis).

[Chem. 12]

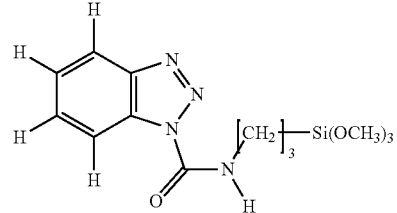

(1)

To 100 parts of the silicone rubber blend A, 1.30 parts (benzotriazole derivative/Pt atom=87 mol/mol) of the benzotriazole derivative-surface-treated reinforcing filler D1 as component (D) was added to form a uniform silicone rubber composition. The composition was measured for cure at 130° C. by a rheometer MDR2000 (by Alpha Technologies). The results are shown in Table 1. Also the composition was press cured at 150° C. for 15 minutes to form a cured product. The cured product was measured for hardness according to JIS K 6249, compression set by a compression set test according to JIS K 6262:2013 using a specimen with a diameter of 13±0.5 mm and a thickness of 6.3±0.3 mm under 25% compression at 200° C. for 24 hours, and hardness change by a heat aging test according to JIS K 6257:2011 at 225° C. for 72 hours. The results are shown in Table 1.

Example 2

On a closed mechanical kneading device under atmospheric pressure, 10 parts of the benzotriazole derivative having the formula (1) and 50 parts of wet silica (trade name: Nipsil LP, by Tosoh Silica Corp.) having a specific surface area of 210 m²/g were mixed and treated at room temperature. At the end of mixing, the mixture was dried, obtaining a reinforcing filler D2 which had been surface treated with the benzotriazole derivative (a blending ratio of the benzotriazole derivative to the reinforcing filler being 1:5 on weight basis).

A uniform silicone rubber composition was obtained by adding 0.71 part (benzotriazole derivative/Pt atom=87 mol/mol) of the benzotriazole derivative-surface-treated reinforcing filler D2 as component (D) to 100 parts of the silicone rubber blend A in Example 1.

The composition was evaluated as in Example 1, with the results shown in Table 1.

Comparative Example 1

The silicone rubber blend A in Example 1, prior to addition of the benzotriazole derivative-surface-treated reinforcing filler D1, was evaluated as in Example 1, with the results shown in Table 1.

Comparative Example 2

A uniform silicone rubber composition was obtained by adding 0.04 part (benzotriazole/Pt atom=82 mol/mol) of benzotriazole to 100 parts of the silicone rubber blend A in Example 1.

The composition was evaluated as in Example 1, with the results shown in Table 1.

TABLE 1

|  | Example | | Comparative Example | |
|---|---|---|---|---|
|  | 1 | 2 | 1 | 2 |
| Cure time T10 (sec) | 36 | 36 | 34 | 61 |
| Cure time T90 (sec) | 66 | 65 | 56 | 112 |
| T90 − T10 (sec) | 30 | 29 | 22 | 51 |
| Hardness (Type A) | 50 | 50 | 50 | 44 |
| Compression set (%) | 22 | 23 | 75 | 40 |
| Hardness after aging test (Type A) | 51 | 51 | 60 | 52 |
| Hardness change after aging test (Type A) | +1 | +1 | +10 | +8 |

The invention claimed is:

1. An addition-curable silicone rubber composition comprising:
  (A) 100 parts by weight of an alkenyl-containing organopolysiloxane having at least two silicon-bonded alkenyl groups per molecule,
  (B) an organohydrogenpolysiloxane having at least two silicon-bonded hydrogen atoms per molecule, in an amount of 0.2 to 20 parts by weight per 100 parts by weight of component (A),
  (C) a catalytic amount of a platinum catalyst, and
  (D) a reinforcing filler which is surface treated with a benzotriazole derivative in an amount of 2 to 1,000 moles per mole of platinum atom in component (C), the benzotriazole derivative having the general formula (I):

[Chem. 1]

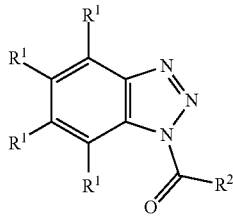

(I)

wherein $R^1$ is hydrogen or a $C_1$-$C_{10}$ monovalent hydrocarbon group and $R^2$ is a monovalent organic group, and a weight ratio of the benzotriazole derivative to the reinforcing filler ranging from 1:1 to 1:20.

2. The addition-curable silicone rubber composition of claim 1 wherein in formula (I), $R^2$ is a $C_1$-$C_{10}$ monovalent hydrocarbon group or a group represented by the following formula:

[Chem. 2]

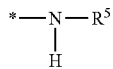

wherein $R^5$ is a $C_1$-$C_{15}$ monovalent hydrocarbon group or —(CH$_2$)$_p$—Si(OR$^6$)$_3$ wherein $R^6$ is a $C_1$-$C_4$ alkyl group or SiR$^7_3$ group (wherein $R^7$ is $C_1$-$C_4$ alkyl), p is an integer of 1 to 6, and * designates a bonding site.

3. The addition-curable silicone rubber composition of claim 1 or 2, further comprising (E) 1 to 100 parts by weight per 100 parts by weight of component (A) of a reinforcing filler which is surface untreated and/or surface treated with an organosilicon compound other than the compound of formula (I).

4. The addition-curable silicone rubber composition of claim 3 wherein component (E) is fumed silica having a specific surface area of at least 50 m$^2$/g as measured by the BET method, the fumed silica being surface treated.

5. The addition-curable silicone rubber composition of claim 1, further comprising (F) 0.1 to 20 parts by weight per 100 parts by weight of component (A) of a non-functional silicone oil having a phenyl content of at least 10 mol % and a viscosity at 25° C. of 100 to 500 mPa·s as measured by a rotational viscometer according to JIS Z 8803:2011.

6. A cured silicone rubber which is formed by curing the addition-curable silicone rubber composition of claim 1 and has a compression set of up to 30% as measured by a compression set test according to JIS K 6262:2013 using a specimen with a diameter of 13±0.5 mm and a thickness of 6.3±0.3 mm under 25% compression at 200° C. for 24 hours.

7. A cured silicone rubber which is formed by curing the silicone rubber composition of claim 1 and experiences a hardness change of up to +5 as measured by a heat aging test according to JIS K 6257:2010 at 225° C. for 72 hours.

8. A method for preparing an addition-curable silicone rubber composition, comprising the steps of:
  surface treating a reinforcing filler with a benzotriazole derivative having the general formula (I):

[Chem. 3]

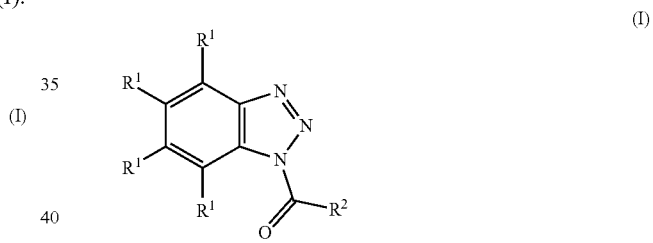

(I)

wherein $R^1$ is hydrogen or a $C_1$-$C_{10}$ monovalent hydrocarbon group and $R^2$ is a monovalent organic group, in such amounts that a weight ratio of the benzotriazole derivative to the reinforcing filler ranges from 1:1 to 1:20, to form a benzotriazole derivative-surface-treated reinforcing filler (D); and thereafter,
  mixing the reinforcing filler (D) with (A) 100 parts by weight of an alkenyl-containing organopolysiloxane having at least two silicon-bonded alkenyl groups per molecule, (B) 0.2 to 20 parts by weight per 100 parts by weight of component (A) of an organohydrogenpolysiloxane having at least two silicon-bonded hydrogen atom per molecule, and (C) a catalytic amount of a platinum catalyst, such that 2 to 1,000 moles of the benzotriazole derivative with which the reinforcing filler is surface treated is available per mole of platinum atom in the platinum catalyst (C).

9. The method for preparing an addition-curable silicone rubber composition of claim 8, further comprising the step of mixing the composition with (E) a reinforcing filler which is surface untreated and/or surface treated with an organosilicon compound other than the compound of formula (I), in an amount of 1 to 100 parts by weight per 100 parts by weight of component (A), and/or (F) a non-functional silicone oil having a phenyl content of at least 10 mol % and a viscosity at 25° C. of 100 to 500 mPa·s as measured by a rotational viscometer according to JIS Z 8803:2011, in an amount of 0.1 to 20 parts by weight per 100 parts by weight of component (A).

\* \* \* \* \*